United States Patent Office

3,703,566
Patented Nov. 21, 1972

3,703,566
GRAFT COPOLYMERISATION PROCESS
Edward William Duck, Southampton, John Michael Locke, Lyndhurst, and Allan John Amass, Southampton, England, assignors to The International Synthetic Rubber Company, Southampton, Hampshire, England
No Drawing. Filed July 31, 1970, Ser. No. 60,099
Claims priority, application Great Britain, Aug. 7, 1969, 39,645/69
Int. Cl. C08f *17/00, 19/04, 27/04*
U.S. Cl. 260—878 R                15 Claims

ABSTRACT OF THE DISCLOSURE

A method of preparing a copolymer having an elastomeric hydrocarbon polymeric backbone and a plurality of side chains comprising polymerising one or more polymerisable monomers (as herein defined) in the presence of an unsaturated hydrcarbon elastomeric polymer of iodine number at most 100 and having attached thereto a plurality of alkali metal atoms. In a preferred embodiment the unsaturated hydrocarbon elastomeric copolymer having attached thereto the alkali metal atoms is one prepared by treating in the substantial absence of aromatic compounds an unstaurated hydrocarbon elastomeric polymer of iodine number at most 100 with a complex of an alkali metal hydrocarbon, wherein the hydrocarbon is saturated, and a polar compound. The unsaturated hydrocarbon elastomeric copolymer is preferably an ethylene propylene terpolymer and the polymerisable monomer(s) is/are selected from butadiene, isoprene and styrene. The products are compatible and covulcanisable with other elastomers of high unsaturation.

---

This application relates to a method of preparing graft copolymers having an elastomeric hydrocarbon polymeric backbone. In one aspect it relates to a method of preparing rubbery copolymers which are compatible with other materials, especially thermoplastics and other rubbers, particularly rubbers of high unsaturation.

Sulphur vulcanisable polymers of relatively low unsaturation (e.g. having an iodine number of 5 to 30 or more) are well known. For example, copolymers of ethylene with other 1-olefins in which a small amount of unsaturation is introduced by polymerisation with another monomer which usually has two or more C=C unsaturations are well known materials which have many advantages. Particularly well known such copolymers are ethylene-propylene-diene-monomer (EPDM) rubbers. Homopolymers of 1-olefins are also known wherein a small amount of unsaturation is introduced by polymerisation with for example a conjugated diene. Butyl rubber wherein 2-methyl propene-1 (isobutylene) is copolymerised with up to approximately 3 moles percent of isoprene is a particularly well known case.

It is frequently desirable to blend such polymers with other materials in an attempt to obtain an optimum combination of properties. However it is found that products with poor physical properties are frequently obtained in this way. In the case of blending these polymers of low unsaturation e.g. EPDM rubber (typically of iodine number 10–20) with highly unsaturated polymers for example polybutadiene (typically of iodine number 470) the poor physical properties arise because of two interrelated phenomena, compatibility and convulcanisability. Because of the essentially saturated nature of the conventional EPDM and butyl rubbers they are largely incompatible with the highly unsaturated rubbers and a two phase structure having either a matrix of one polymer with the other dispersed within it or alternatively having interpenetrating networks of each polymer is produced. Furthermore, differences in solubilities of compounding ingredients e.g. oil or carbon black, in the components of the blend gives rise to poor, uneven dispersion and the vastly different rates of cure of the components results in an unbalanced distribution of the curing agent(s) because the faster curing highly unsaturated rubber sequesters most of such agent(s). Thus at the end of the optimum curing time, this element of the blend will be overcured whilst the slower curing rubber will be cured little, if at all.

We have now found that elastomeric hydrocarbon materials having relatively low unsaturation may be chemically modified to produce copolymers which are compatible and where appropriate covulcanisable with other materials.

Thus according to the present invention a method of preparing a copolymer having an elastomeric hydrocarbon polymeric backbone comprises polymerising one or more polymerisable monomers (as hereinafter defined) in the presence of an unsaturated hydrocarbon elastomeric polymer of iodine number at most 100 and having attached thereto a plurality of alkali metal atoms.

In a preferred embodiment of the present invention there is provided a method of preparing a copolymer having an elastomeric polymeric backbone and a plurality of side chains which comprises:

(1) Treating in the substantial absence of unsaturated compounds an unsaturated hydrocarbon elastomeric polymer of iodine number at most 100 with a complex of an alkali metal hydrocarbon, wherein the hydrocarbon is saturated, and a polar compound to form a plurality of active sites on the polymeric backbone, and (2) Polymerising one or more polymerisable monomers (as hereinafter defined) at the active sites on the polymeric backbone.

The unsaturated hydrocarbon elastomeric polymers which may be used in the process are derived from one or more 1-olefins and a monomer which on polymerisation confers unsaturation on the final polymer. Thus examples of suitable polymers are those based on ethylene/propylene, propylene/butene-1 or isobutylene. The amount of monomer which confers the unsaturation on the polymer is generally up to 10% molar of the total. Normally up to 5% molar is used, the exact amount depending on the monomer employed. Examples of suitable monomers are dicyclopentadiene, ethylidene norbornene, cyclooctadiene, norbornadiene, 1,4 hexadiene and endomethylene methyl hexahydro naphthalene (EMHN) which are usually employed in for example ethylene/1-olefin copolymers and conjugated dienes such as isoprene which are normally employed with, for example, isobutylene. Such polymers are themselves known and the choice of type and amount of the unsaturated monomer included is similarly well known. The problems of compatibility however only arise with polymers having iodine numbers of 100 or less, generally 2–70 and frequently in the range 5–30. These polymers are usually prepared in inert organic solvent solution for example, in hexane, toluene, xylene and/or cyclohexane using a transition metal based catalyst. Polymers of for example, isobutylene, however, are prepared using a different polymerisation reaction at low temperature using a cationic catalyst. The polymers may be recovered in the solid form or if prepared in hydrocarbon solution e.g. hexane, retained as such or as a concentrated "cement."

However for further reaction it is preferred that the polymer is in solution in organic solvent which is substantially air and moisture free and which does not contain impurities which would react with the reagents to be used in the metalation step. For this reason halogen-containing solvents are best avoided and if a halogen-containing catalyst has been used in the preparation of the polymer, the halogen residue is best removed. To ensure that the polymer solution is dry it is desirable to pass it over for example activated alumina. For optimum metalation the polymer solution and other solvents used must also be free of unsaturated hydrocarbons including aromatic hydrocarbons e.g. benzene. This may be achieved by passing the solution and all solvent to be used in the process over silver nitrate deposited on alumina prior to drying (Ref. Murray, E. C., Keller, R. N., Org. Chem. 34 2254, 1969). The purity of solvents may readily be checked using ultra violet spectroscopy which will reveal the presence of any aromatic impurities. Particularly preferred solvents for the polymer are saturated hydrocarbons having 5 to 10 carbon atoms especially hexane or cyclohexane.

The alkali metal atoms may be introduced into the polymer by any suitable means. A particularly suitable method of forming a plurality of active sites on the polymeric backbone is to admix a solution of the polymer as described above with a complex of an alkali metal hydrocarbon wherein the hydrocarbon is saturated and a polar compound. The alkali metal is preferably lithium and the hydrocarbon is preferably an alkyl having from 1 to 12 carbon atoms. Examples are methyl lithium, ethyl lithium, butyl lithium, amyl lithium, 2-ethyl hexyl lithium and n-dodecyl lithium. n-Butyl lithium is very suitable. The polar compound may be for example a poly tert-amine or a compound of an alkali metal different from the alkali metal of the hydrocarbon in which the alkali metal is bound to a hetero atom e.g. an alkoxide such as potassium-t-butoxide. Tetra methyl ethylene diamine and particularly potassium-t-butoxide are preferred since these give the to an active species which readily attacks the polymer chain so that the complex becomes attached thereto. The mole ratio of alkali metal hydrocarbon to polar compound is suitably 1:1. Desirably the mole ratio is within the range 0.1:1 to 2.5:1 preferably 0.5:1 to 2:1.

The amount of alkali metal hydrocarbon complex should generally be such that after reaction there is substantially no unreacted complex which in the subsequent polymerisation reaction would itself act as an initiator in competition with the alkali-metal containing polymer giving rise to a mixture of products. The amount required will depend on the reaction conditions employed and the efficiency with which the alkali metal atoms become attached to the polymer chains. Clearly there must be at least an excess of the polymer (based on the number of carbon-carbon double bonds in the polymer) and generally up to at least twice the stiochiometric amount required to react with the alkali metal complex since reaction efficiencies are generally low (e.g. 50% or less). Usually a small molar amount of alkali metal complex is used up in side reactions and this should be taken into account. Alternatively the polymer solution may be scavenged with small portions of alkali metal hydrocarbon until no further reacts (as detected using Michlers Ketone Test which shows the presence of unreacted alkali metal hydrocarbon).

In the preferred procedure in which an organo-metallic compound such as a lithium alkyl is used complexed with a polar compound reaction begins on admixture with the polymer. Reaction at a suitable rate may occur at ordinary temperatures e.g. 20° C. but in many cases more rapid reaction will occur at elevated temperatures e.g. 50° C.–90° C. suitably 70° C. and such elevated temperatures are preferred. Higher temperatures are normally undesirable since side reactions and polymer degradation are liable to occur. During reaction the colour of the solution generally changes from e.g. white/colourless to a straw colour or dark red.

During the reaction with the polymer a plurality of alkali metal atoms are attached to the polymer chain at or adjacent to the carbon atoms of the carbon-carbon double bonds generally replacing allylic hydrogen atoms. The number of metal atoms which become attached per unsaturated polymer chain will depend on the unsaturation, reaction efficiency and reaction conditions. By adjustment of the reaction conditions (e.g. reaction time or molar amounts used) the number of metal atoms attached may be controlled. Normally up to about 40 metal atoms, e.g. 25, become attached per 8000 chain carbons in the polymer chain in a polymer of iodine number 12, although in polymers of higher unsaturation, e.g. iodine number 70, about 300 or more may be attached per 8000 chain carbon atoms. However at these higher levels there is a tendency for the polymer to gel. Preferably the reaction conditions should be adjusted so that up to 20 metal atoms are attached, preferably 2 to 10. Generally it is found that the lower the concentration of metal hydrocarbon complex used to introduce active sites on to the polymer chain the fewer such sites are produced. In the polymerisation reaction of the invention each metal atom acts as a site for the polymerisation of the polymerisable monomers(s) and by this means the number of polymer chains growing onto the backbone polymer may be controlled.

When the metalation reaction has terminated, one or more polymerisable monomers, that is those monomers which are polymerisable by means of an anionic catalyst, may be introduced. These may be chosen for example from conjugated dienes such as butadiene, isoprene, dimethyl butadiene and piperylene, or vinyl aromatic compounds such as styrene, substituted styrenes e.g. α-methyl styrene and halo styrenes, nitroalkenes such as nitroethylene or chloronitroethylene, alkyl esters of unsaturated acids particularly acrylic, methacrylic and itaconic acid and other activated vinyl group containing compounds e.g. acrylamides, acrylonitrile and vinyl carbazole. Such monomers polymerise onto the backbone polymer at each point of attachment of an alkali metal atom, the reaction proceeding at e.g. 20° to 90° C.

By suitable choice of monomer(s) it is possible to grow onto the backbone polymer one or more of a variety of different monomers so that the final product is compatible and covulcanisable with a corresponding variety of polymers derived entirely or predominantly from the monomer(s) in the pendant chains. In this way a copolymer having an elastomeric hydrocarbon polymer backbone with pendant polymer chains may be produced. Most usefully the pendant polymers are homopolymers of butadiene or isoprene or styrene or copolymers containing at least 50% by weight of one or more of these since these are by themselves commonly available polymers with which the copolymer product of the invention may be satisfactorily blended.

When the desired molecular weight has been reached reaction may be terminated in the normal way by for instance adding an alcohol and/or acid and the polymer recovered.

As opposed to deactivation by replacing the alkali metal on each polymer chain by a hydrogen, reactive groups may, if desired, be introduced using termination reactions such as those known in anionic polymerisation which produce groups such as —COOH or —OH, e.g. blowing in carbon dioxide or air followed by hydrolysis with dilute acid. In this way a copolymer having pendant chains which have reactive end-groups may be produced.

The number average molecular weight of the pendant polymer chains may be varied within wide limits e.g. 500 to 500,000 and chosen to suit the properties desired in the final polymer. The number average molecular weight of the elastomeric hydrocarbon polymeric backbone may be for example 20,000 to 800,000, suitably 100,000 to 500,000. Desirably to retain the characteristic properties of the polymeric backbone the number average molecular weight of the pendant polymer chains should be small relative to the number average molecular weight of the backbone, for example 3 to 20%. Thus the average molecular weight of pendant polymer chains may be 5,000–25,000 e.g. 15,000 for a backbone polymer molecular weight of 140,000. Desirably also the number/ average molecular weight of the pendant chains is such that their total molecular weight per backbone polymer is an average from 25% to 100% of that of the backbone polymer alone. Preferably for maximum compatibility the length and number of the pendant side chains are such that the iodine number in the final product is not more than 100 preferably not more than 80.

The invention is particularly applicable to ethylene propylene terpolymer rubbers wherein the termonomer is a bridged ring monomer such as ethylidene norbornene or endomethylene methyl hexa hydronaphthalene the product in such cases being readily compatible and covulcanisable with elastomers of high unsaturation e.g. polybutadiene, or butadiene styrene copolymer (S.B. rubber). This is believed to be because the pendant side chains are able to penetrate the high unsaturation elastomeric phase and a sharp boundary between the two polymer phases does not occur. During vulcanisation cross linking occurs between the pendant side chains and the highly unsaturated elastomer, bonding the two together tightly. Generally the longer the pendant side chains the greater is the degree of penetration into the high unsaturation elastomeric phase resulting in greater covulcanisation.

Blends of copolymers prepared according to the invention with high unsaturation rubbers or plastics such as polybutadiene, polyisoprene, butadiene-isoprene copolymer, isoprene-styrene copolymer or polystyrene may be readily obtained which in the case of rubbers are subsequently compounded and vulcanised. Such blends may be used for the preparation of moulded or shaped articles for a wide variety of end uses particularly where increased ageing resistance is required.

EXAMPLE 1

10 g. of a purified ethylene propylene terpolymer rubber having the following characteristics:

Ethylene = 60% (molar)

Termonomer = EMHN

Iodine No. = 11

Mooney viscosity $ML_{1+4}^{100°} = 40$ was dissolved in dry distilled n-hexane to a concentration of 5% wt./volume, in a dry nitrogen flushed polymerisation bottle which contained activated alumina. The polymer solution was dried for 24 hours and then filtered under a dry nitrogen atmosphere into a fresh nitrogen flushed bottle. A solution of lithium butyl and tetramethyl ethylene diamine in hexane in the molar concentration 1:1.25 was prepared and 4.0 ml. (4 millimole of LiBu) was injected into the polymer solution which was warmed to 70° C. Reaction was allowed to proceed for 16 hours. The temperature of the solution was lowered to 50° C. and 12.0 g. of butadiene injected. After 18 hours polymerisation was terminated by adding a solution of methanol/HCl containing STAVOX antioxidant. The polymer precipitated and was recovered and dried. Yield was 16.7 g. of a rubbery product which after refluxing in methyl ethyl ketone to remove any homopolybutadiene, had an iodine number of 146 and when compounded as follows:

| | Parts |
|---|---|
| Polymer | 100 |
| ZnO | 5 |
| Stearic acid | 1 |
| CIRCOSOL 4240 | 10 |
| Carbon black (HAF) | 40 |
| Tetra methyl thiuram mono sulphide (TMTMS) | 1 |
| Sulphur | 1 | had a cure time of 8 minutes at 154° C. as indicated by Wallace Shawbury curometer (compared with 15 minutes for the original terpolymer).

EXAMPLE 2

Example 1 was repeated with the variations shown in the table together with the results obtained:

| | |
|---|---|
| Volume LiBu/TMEDA solution ml. | 6.0 |
| Weight of butadiene added (gm.) | 14.5 |
| Yield gm. | 17.0 |
| Iodine number of final product | 147 |
| Cure time | 9′ |

The glass transition temperatures of this polymer and that from Example 1 were both −59° C. which compares with the unmodified polymer $T_g$ of −50° C. and that of polybutadiene (approx. −80° C.)

From these results it can be seen that there is a large increase in iodine number and corresponding decrease in cure time as well as a decrease in glass transition temperature. This is clear indication that polybutadiene chains are attached to the ethylene propylene terpolymer chains.

EXAMPLES 3–5

Example 1 was repeated except that the ethylene propylene polymer used had an iodine number of 2.8 and the reaction conditions were varied as shown in the table (together with the results obtained):

| Example No. | Volume LiBu/TMEDA solution (ml.) | Weight of butadiene added (gm.) | Iodine number of final product |
|---|---|---|---|
| 3 | 5 | 0.44 | 9.5 |
| 4 | 5 | 1.10 | 19.0 |
| 5 | 10 | 1.10 | 19.0 |

As before the increase in iodine number obtained indicates that butadiene units are attached to the ethylene-propylene terpolymer.

EXAMPLES 6–10

Example 1 was repeated except that the hexane used in all cases was purified by passing it down a column of silver nitrate deposited on alumina followed by distillation from lithium butyl. The lithium butyl to tetramethyl ethylene diamine (TMEDA) mole ratio was 1:1 and other variations are given in the table. The metalation reaction was allowed to proceed for 4 hours before cooling and adding the butadiene.

| Example No. | (LiBu/TMEDA) mmoles/10 g. EPT | Weight of Bd added/10 g. EPT (gm.) | $I_2$ No. | $T_g$, °C. |
|---|---|---|---|---|
| 6 | 4 | 15 | 62 | −49 |
| 7 | 8 | 14 | 39 | −46 |
| 8 | 10 | 13 | 37 | −48 |
| 9 | 15 | 6.5 | 20 | −47 |
| 10 | 15 | 18 | 48 | −46 |

EXAMPLES 11–15

10 g. of a purified ethylene propylene terpolymer (EPT) rubber having the following characteristics Ethylene content = 60% (molar)

Termonomer = ethylidene norbornene

Iodine number = 20

Mooney viscosity (as Ex. 1) = 78 was dissolved in hexane, purified as described in Examples 6–10, to a concentration of 5% wt./volume, and dried as in Example 1 and scavenged with 4.5 mmole of lithium butyl.

A solution of lithium butyl and sublimed potassium tertiary butoxide in equimolar quantities was prepared in hexane purified as described in Examples 6–10 (1 millimole of lithium butyl per ml. of hexane). Quantities of this solution as shown in the table were injected into the polymer solution which was warmed to 70° C. Reaction was allowed to proceed for the period shown before the temperature of the solution was lowered to 50° C. and butadiene (Bd) injected. After 15 hours the reaction was terminated as described in Example 1 and the purified polymer analysed. Results are quoted in the table.

| Example No. | (LiBu/KOtBu) mmoles/ 10 g. EPT | Reaction time (hrs.) | Weight of Bd added/ 10 g. EPT (gm.) | I₂ No. | T_g, °C. |
|---|---|---|---|---|---|
| 11 | 0.01 | 2 | 7.4 | 130 | −48 |
| 12 | 0.05 | 2 | 7.5 | 60 | −49 |
| 13 | 0.1 | 2 | 8.1 | 63 | −49 |
| 14 | 0.2 | 2 | 7.8 | 70 | −46 |
| 15 | 0.5 | 2 | 8.0 | 79 | −46 |

Other reactions were carried out at a lithium butyl/potassium-t-butoxide concentration of 1.0, 2.0, 3.0, 4.0 and 5.0 millimoles per 10 grams of ethylene propylene copolymer. A polymer gel was formed before the butadiene could be added indicating a high degree of metalation with the formation of ionic cross linkages. This gel was readily dispersable by the addition of hydrochloric acid in methanol.

EXAMPLES 16 to 22

Further samples of polymers similar to those described in Examples 11 to 15 were prepared as shown in the table. These polymers were compounded to the following formulation:

| | Parts by wt. |
|---|---|
| EPT (modified or unmodified) | 30 |
| Styrene butadiene copolymer Grade 1502 | 70 |
| HAF black | 60 |
| Naphthenic oil (CIRCOSOL) 4240 | 15 |
| Zinc oxide | 5 |
| Stearic acid | 1.25 |
| Sulphur | 1.33 |
| N-oxydiethylene-2-benzthiazyl sulphenamide | 0.85 |
| Diphenyl guanidine | 0.4 | and vulcanised at 154° C. for the optimum cure time. The physical properties of the compounds plus those from a similar compound in which an unmodified EPT was used for comparison are given in the table (as tested according to British standard specification No. 903).

The physical properties of these samples when compounded to the formulation described in Example 16 and vulcanised at 154° C. for the optimum cure time are given in the table.

| Sample | A | B | C |
|---|---|---|---|
| Cure time, mins | 25 | 25 | 20 |
| 100% mod., p.s.i | 423 | 382 | 367 |
| 200% mod., p.s.i | 1,184 | 1,193 | 1,086 |
| 500% mod., p.s.i | 2,062 | 2,083 | 1,875 |
| Tensile, p.s.i | 2,820 | 2,910 | 2,640 |
| E/B, percent | 430 | 405 | 407 |
| Hardness, IRHD | 72 | 71 | 71 |

What we claim is:

1. A method of preparing a copolymer having an elastomeric hydrocarbon polymeric backbone having a plurality of side chains, comprising polymerising at least one polymerisable monomer selected from the group consisting of butadiene, isoprene and styrene in the presence of an unsaturated hydrocarbon elastomeric polymer of iodine number of 5 to 30 and having attached thereto a plurality of alkali metal atoms, said backbone polymer being derived from ethylene and at least one 1-olefin selected from the group consisting of propylene and butene-1 and a nonconjugated diene monomer which confers unsaturation on the final backbone copolymer.

2. A method according to claim 1 wherein the monomer which confers unsaturation is dicyclopentadiene, ethylidene norbornene, cyclooctadiene, norbornadiene or endo methylene methyl hexahydronaphthalene.

3. A method according to claim 1 wherein the number of alkali metal atoms attached to the polymer chain is at most 40 per 8,000 chain carbon atoms.

4. A method according to claim 3 wherein the number of atoms attached is at most 20 per 8,000 chain carbon atoms.

5. A method according to claim 4 wherein the number of atoms per 8,000 chain carbon atoms attached is 2–10.

6. A method according to claim 1 wherein the polymerisable monomer is either butadiene or isoprene.

7. A process according to claim 1 wherein the polym-

| | Example Number | | | | | | |
|---|---|---|---|---|---|---|---|
| | 16 | 17 | 18 | 19 | 20 | 21 | 22 |
| LiBu/KO-t-Bu Mmoles/10 g. EPT | 0.05 | 0.2 | 0.5 | 0.05 | 0.2 | 0.5 | |
| Weight of Bd added/10 g. EPT | 10.0 | 9.0 | 8.8 | 13.8 | 14.4 | 15.2 | |
| I₂ No | 38 | 46 | 50 | 41 | 28 | 85 | 20 |
| T_g, °C | −46 | −47 | −47 | −47 | −47 | 1−49 | −46 |
| Cure time, mins | 20 | 20 | 15 | 25 | 20 | 25 | 27 |
| 100% mod. p.s.i | 621 | 447 | 570 | 405 | 417 | 353 | 310 |
| 200% mod., p.s.i | 1,484 | 1,373 | 1,340 | 1,247 | 1,168 | 1,058 | 1,060 |
| 300% mod., p.s.i | 2,367 | 2,236 | 2,325 | 2,146 | 2,048 | 1,911 | 1,875 |
| Tensile, p.s.i | 2,864 | 2,752 | 2,452 | 2,662 | 2,720 | 2,680 | 2,160 |
| Percent elong. at break | 350 | 370 | 320 | 370 | 393 | 425 | 350 |
| Hardness, IRHD | 71 | 73 | 70 | 72 | 70 | 70 | 65 |

NOTE.—Example 22 is for comparison.

From these results it can be seen that modification of the ethylene propylene terpolymer (EPT) according to the invention improves the compatibility of the EPT with styrene butadiene copolymer resulting in improved physical properties.

EXAMPLE 23

The procedure of Examples 6–10 was repeated with the modifications given in the table. In these examples a mixture of styrene and butadiene in the approximate weight ratio 25:75 was used. In each case the products showed excellent compatibility and covulcanisability with a styrene-butadiene copolymer rubbers (grade 1502).

| Sample | LiBu/KO-t-Bu mmoles/10 g. EPT | Wt. added/10 g. EPT Bd | St | I₂ No. | T_g, °C. | Percent St |
|---|---|---|---|---|---|---|
| A | 0.5 | 7.9 | 2.4 | 26 | −46 | 2 |
| B | 0.25 | 7.7 | 2.1 | 36 | −48 | 5 |
| C | 0.5 | 9.2 | 2.7 | 35 | −47 | 5 | erization is carried out in a saturated hydrocarbon solvent having 5 to 10 carbon atoms at a temperature of 20 to 90° C.

8. A method of preparing a copolymer having an elastomeric polymeric backbone and a plurality of side chains which comprises:

(1) treating in the substantial absence of unsaturated compounds an unsaturated hydrocarbon elastomeric polymer of iodine number of 5 to 30 with a complex of a lithium alkyl having 1 to 12 carbon atoms and a polar compound selected from the group consisting of tetra methyl ethylene diamine and an alakli metal alkoxide to form a plurality of active sites on the polymeric backbone, said backbone polymer being derived from ethylene and at least one 1-olefin selected from the group consisting of propylene and butene-1 and a nonconjugated diene monomer which confers unsaturation on the final backbone polymer, and (2) polymerizing at least one polymerizable monomer selected from the group consisting of butadiene, isoprene and styrene at the active sites on the polymeric backbone.

9. A method according to claim 8 wherein said polar compound is potassium-t-butoxide.

10. A method according to claim 8 wherein the number of alkali metal atoms attached and the length of the pendant side chains are such that the iodine number in the copolymer is at most 80.

11. A method according to claim 8 wherein the alkali metal hydrocarbon to polar compound ratio is in the range 0.1:1 to 2.5:1.

12. A method according to claim 8 wherein the unsaturated hydrocarbon polymer is treated with the alkali metal hydrocarbon complex at a temperature of 50° C. to 90° C.

13. A method according to claim 8 wherein the number of alkali metal atoms attached to the polymer chain is at most 40 per 8,000 chain carbon atoms.

14. A method according to claim 13 wherein the number of atoms attached is at most 20 per 8,000 chain carbon atoms.

15. A method according to claim 13 wherein the number of atoms per 8,000 chain carbon atoms attached is 2–10.

References Cited

UNITED STATES PATENTS

| | | | |
|---|---|---|---|
| 3,492,369 | 1/1970 | Naylor | 260—877 X |
| 3,489,821 | 1/1970 | Witt et al. | 260—876 |
| 3,489,822 | 1/1970 | Witt et al. | 260—878 |
| 3,538,190 | 11/1970 | Meredith et al. | 260—878 |
| 3,483,273 | 12/1969 | Prucnal et al. | 260—878 |
| 3,451,988 | 6/1969 | Langer | 260—878 X |

SAMUEL H. BLECH, Primary Examiner

H. W. ROBERTS, Assistant Examiner

U.S. Cl. X.R.

260—33.6 PQ, 79.5 AB, 876 R, 877